McCormick, Erpelding & Baker.
Mower.

No. 98,394. Patented Dec. 28, 1869.

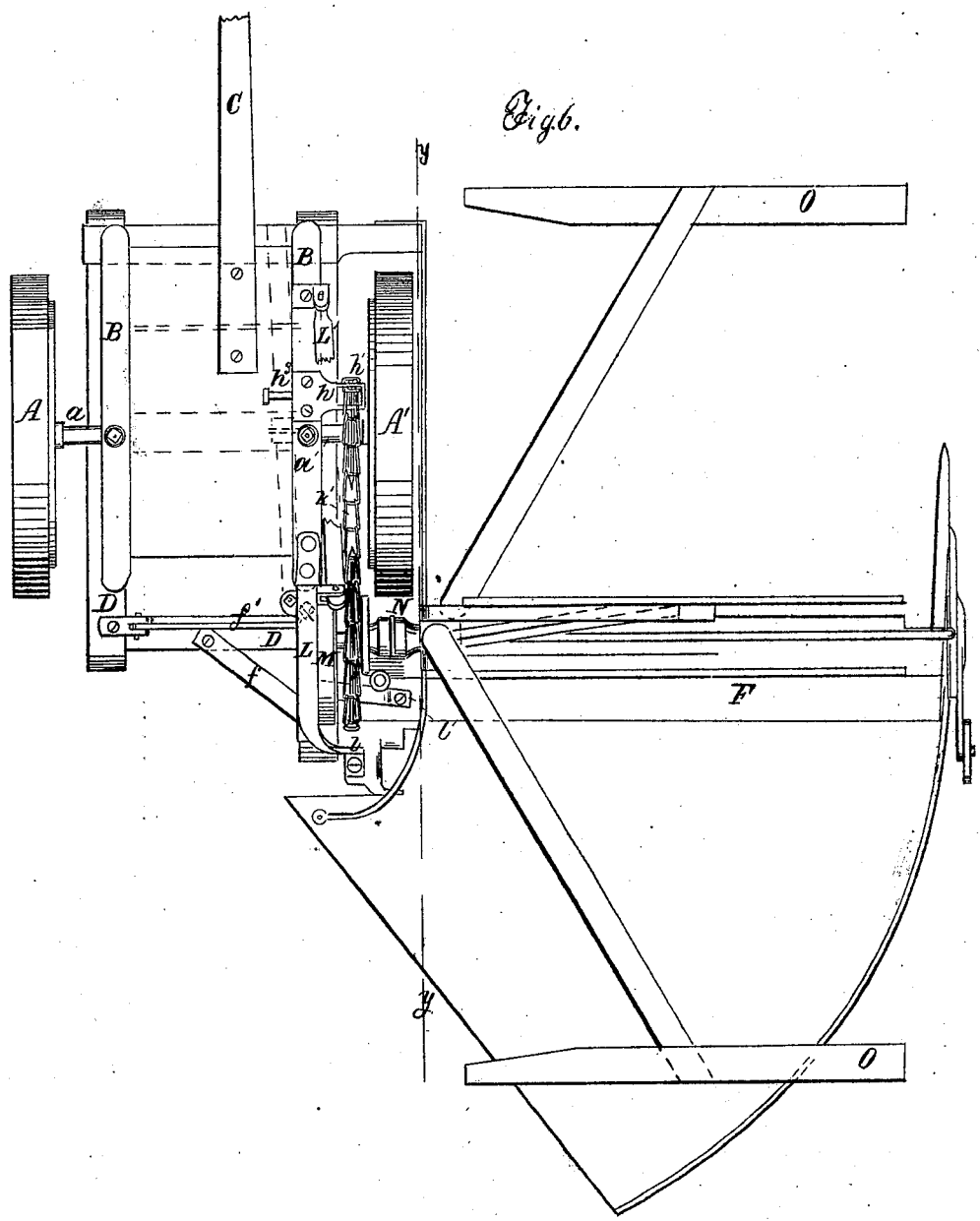

McCormick, Erpelding & Baker.
Mower.
No. 98,394. Patented Dec. 28, 1869.
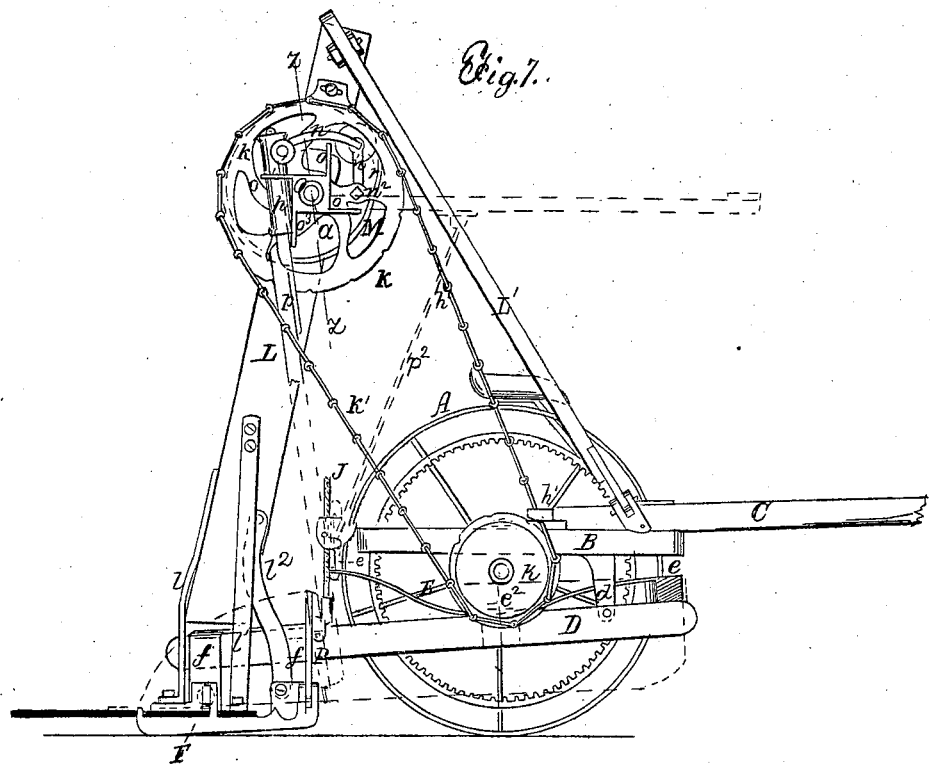
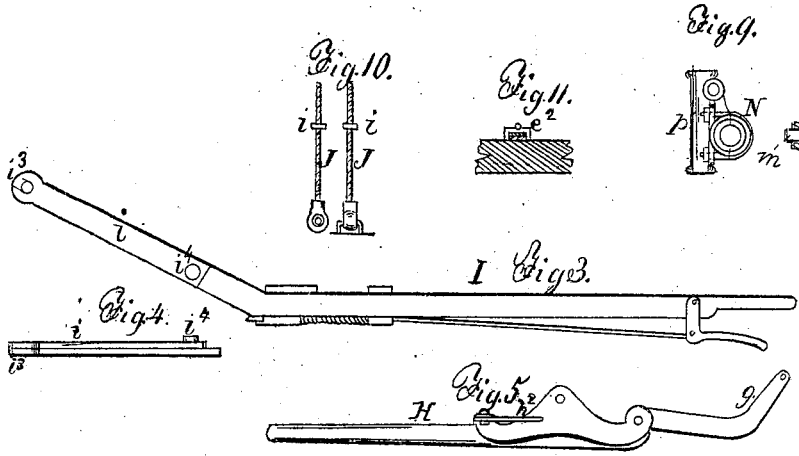

UNITED STATES PATENT OFFICE.

LEANDER J. McCORMICK, LAMBERT ERPELDING, AND WILLIAM R. BAKER, OF CHICAGO, ILLINOIS, ASSIGNORS TO C. H. McCORMICK & BROTHER, OF SAME PLACE.

IMPROVEMENT IN HARVESTERS.

Specification forming part of Letters Patent No. 98,394, dated December 28, 1869.

*To all whom it may concern:*

Be it known that we, LEANDER J. McCORMICK, LAMBERT ERPELDING, and WILLIAM R. BAKER, all of Chicago, in the county of Cook and State of Illinois, have invented certain new and useful Improvements in Harvesters, of which the following is a full, clear, and exact description:

Our invention relates to the raking devices; and our improvement consists, first, in a novel method, hereinafter described, of combining and constructing the raking mechanism; second, in a novel method of combining with a two-wheeled hinged-joint harvester, an overhung reel and a side-delivery rake, operating as hereinafter described.

The accompanying drawings show all our improvements embodied in one machine, and that of the kind patented by us September 15, 1868, and October 27, 1868.

It is obvious, however, that some of our improvements may be used without the others, and may also be adapted to machines of constructions differing from that shown.

Figure 1:
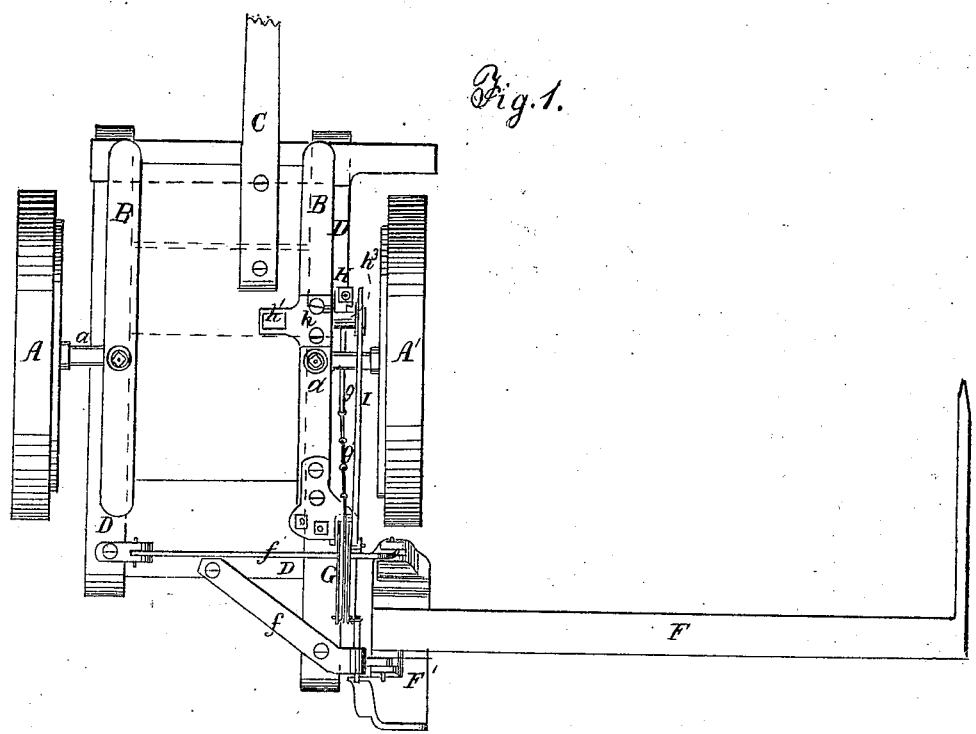
Figure 2:
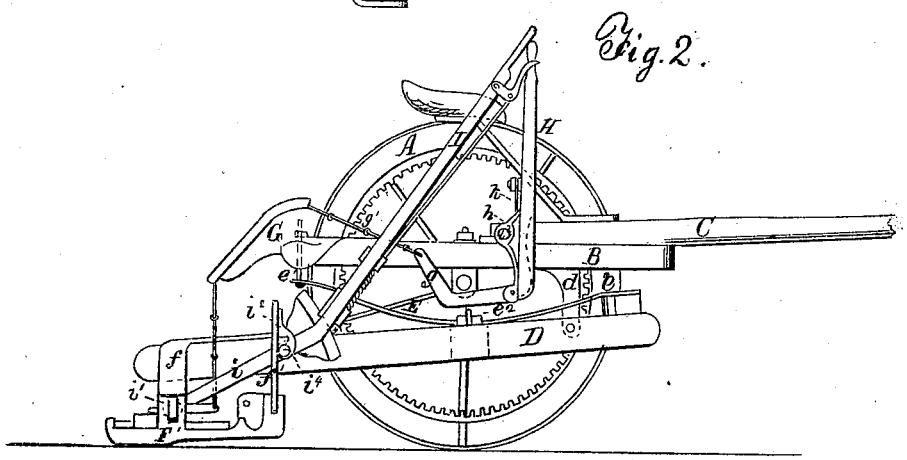

Figure 1 represents a plan or top view of our improved machine arranged for mowing; Fig. 2, a side view of the same, partly in elevation and partly in section, at the line $x\ x$ of Fig. 1; Fig. 3, a side view of the rocking-lever detached; Fig. 4, an edge view of the lower part of said lever; and Fig. 5, a side view of the lifting-lever. Fig. 6 represents a plan or top view of our machine arranged as a self-raking reaper; Fig. 7, a side view of the same, partly in elevation and partly in section, at the line $y\ y$ of Fig. 6; Fig. 8, a section through the rake mechanism, at the line $z\ z$ of Fig. 7; Fig. 9, an end view of the collar on which the rake and reel-arms are mounted; Fig. 10, views of the screw for holding the main and coupling frames together; and Fig. 11, a section, 1 1 of Fig. 7, of the flange-cap for holding the lifting-spring in its place.

In this instance, two driving-wheels, A A', are shown as turning loosely on a fixed axle, $a$, mounted on a suitable main frame, B, from which a rigid tongue, C, projects. A coupling-frame, D, is pivoted to vibrate freely, vertically, in brackets or down-hangers $d$, on the main frame.

We, by preference, pivot this frame on a countershaft extending across the main frame, and carrying pinions gearing into proper gear-wheels on the driving-wheels A, in the usual way, the pinions being connected with the countershaft by suitable backing-ratchets.

We secure a long plate-spring, E, at one end, $e$, to the coupling-frame, in front of its pivots $d$, and at its other end to an adjusting-screw, $e^1$, working in a bearing on the main frame. The spring is secured to the coupling-frame, near its middle, by a flanged plate, $e^2$, Fig. 11, firmly bolted to the coupling-frame. The overlapping flanges of this plate prevent the spring from being deflected sidewise out of its proper position by the working of the coupling-frame. More than one leaf may be used in the spring, if required.

By means of the set-screw $e^1$ the rear end of the spring may be raised or lowered, thus varying the downward pressure on the front end of the coupling-frame, and correspondingly counteracting the weight of the rear end of the coupling-frame.

A laterally-projecting cutting apparatus, F, is hinged to the coupling-frame by means of a stirrup, $f$, and coupling-arm $f'$, as shown in our former patents above named. We pivot a strap, $i$, on the swiveling eye-bolt $i^1$, which connects the shoe F' with the stirrup $f$. This strap reaches to the lug $i^2$ on the coupling-arm $f'$. The rocking lever I has a fork or yoke, $i^3$, at its lower end, as shown in dotted lines in Fig. 3, which slips over the eye-bolt $i^1$. This lever is inserted between the lugs on the coupling-arm, and secured by a screw, $i^4$, passing through the lugs, the strap $i$, and the lever I, which last is thus securely held in place. A spring-detent and sector-rack, of well-known construction, holds the lever in any desired position to regulate the angle of the guards to the ground in mowing.

As this lever is useless in reaping, it is removed simply by taking out the screw $i^4$, which allows the lever to be removed. The strap $i$ remains, and is secured in the lugs again by the screw $i^4$.

The lifting-lever H rocks on a fulcrum, $h^3$, in a bracket, $h$, having a guide, $h^1$, for the reel-chain, on its opposite end. The bracket is reversible, so as to bring the lever-fulcrum outside when mowing, and the chain-guide when reaping, as shown in Figs. 1 and 6. A spring, $h^2$, on the lever, serves to keep it in a position convenient to the hand. A link, $g$, and chain $g'$, connect this lever with the finger-beam, first passing over the rocking-segment G in a manner similar to that shown in our patent of October 27, 1868.

Our machine is, of course, to be provided with a driver's seat, gearing, and cutting apparatus; but as these details form no part of the subject-matter of our claims, we deem it unnecessary to describe them in detail.

The operation of our machine as a mower will also readily be understood from the description above given, and by reference to our former patents above mentioned.

The mechanism above described is also shown and claimed in our patent of April 27, 1869, No. 89,324, which is a division of this application.

To adapt our machine to reaping, we remove the lifting and rocking levers, and attach a platform (by preference sector-shaped) to the finger-beam in any well-known way.

The coupling-frame is rendered rigid relatively to the main frame by screwing the nuts $i$ $i^1$ up or down on the spindle J, which is pivoted to the coupling-frame, as shown in Fig. 10, and is allowed to play freely, endwise, in its bearing on the main frame when mowing. One nut being above and the other below the main frame, all vertical play is effectually prevented when they are screwed up. The bracket $h$ is then reversed to bring the chain-guide $h^1$ over the sprocket-wheel K, which turns on the main axle, being keyed fast on the inner driving-wheel A'.

The reeling and raking devices are mounted on a single post, L, arranged vertically over the inner side timber of the coupling-frame and inside the driving-wheel, where it is secured by three braces, $l$ $l^1$ $l^2$, respectively bolted to the rear, middle, and front of the shoe F', as shown in Fig. 7.

This construction gives a firm support to the post, and likewise enables us to diminish the width of the machine, and, consequently, the side draft.

The reel-post is braced at top by a link, L', pivoted to it and to the main frame, as shown in our patent of September 15, 1868. A cam-guide, M, and stud-axle $m$, are secured to the post L, near its top. A collar, N, revolves on this axle $m$, and has a sprocket-pulley, $k$, and reel-head O, which may be cast in one piece with it. A chain, K', drives this sprocket-pulley from the wheel K on the main axle. Reel-ribs $o$ $o^1$ $o^2$ $o^3$ are arranged equidistantly around the collar N, in the way common with overhung reels. A rake, P, is secured to an arm, $p$, turning in a socket, $p^1$, secured to the collar N, and revolving with and around it. A connecting-rod, $p^2$, is swiveled to the rake-arm at one end, and to one of the reel-ribs at the other, by means of ball-and-socket joints, to prevent straining the pivots of the connecting-rod, and to give the rake its proper turning movement, as hereinafter explained. (See red lines in Fig. 7.) A crank, $r$, connects the socket $p^1$ with a link, $r^1$, pivoted at $r^2$, to the sprocket-wheel K, and carrying a roller, $r^3$, running in the track of the cam-guide. (See Fig. 7.)

The operation of the rake will readily be understood. The reel revolves, pressing the grain back against the cutters, which sever it, and then lay it on the platform. The rake revolves around the reel, and enters the standing grain close behind one of the reel-beaters, $o$. The guide-cam is so formed as to cause the rake to sweep the platform horizontally in the arc of a circle, to discharge the gavel behind the driving-wheel, and then to rise and move forward around the reel-shaft, to descend in front of the machine again.

It will be seen by those familiar with this class of machines that we have secured a very compact and effective machine.

We do not claim, broadly, a rake rotating on a horizontal axis, or a rake mounted on a hinged finger-beam.

What we claim as our invention, and desire to secure by Letters Patent, is—

1. The combination of the turning rake-arm $p$, swiveled connecting-rod $p^2$, socket $p^1$, crank $r$, link $r^1$, roller $r^3$, and guide-cam M, operating substantially as set forth.

2. The combination of the main frame, supplementary frame, driving-wheels, hinged finger-beam, the overhung reel, and the rotating turning-rake mounted on the finger-beam, all these parts being constructed for joint operation, as set forth.

In testimony whereof, we have hereunto subscribed our names.

L. J. McCORMICK.
LAMBERT ERPELDING.
WM. R. BAKER.

Witnesses:
C. A. SPRING, Jr.,
WM. R. SELLECK.